United States Patent
Pan et al.

(10) Patent No.: US 11,576,403 B2
(45) Date of Patent: Feb. 14, 2023

(54) METHODS FOR ENHANCING METABOLIC HEALTH IN AN ANIMAL

(71) Applicant: Société des Produits Nestlé S.A., Vevey (CH)

(72) Inventors: Yuanlong Pan, Chesterfield, MO (US); Hui Xu, Chesterfield, MO (US)

(73) Assignee: Societe des Produits Nestle S.A., Vevey (CH)

( * ) Notice: Subject to any disclaimer, the term of this patent is extended or adjusted under 35 U.S.C. 154(b) by 457 days.

(21) Appl. No.: 16/705,875

(22) Filed: Dec. 6, 2019

(65) Prior Publication Data

US 2020/0187526 A1    Jun. 18, 2020

Related U.S. Application Data

(60) Provisional application No. 62/779,139, filed on Dec. 13, 2018.

(51) Int. Cl.
| | |
|---|---|
| A23K 50/40 | (2016.01) |
| A23K 10/30 | (2016.01) |
| A23K 20/163 | (2016.01) |
| A23K 10/20 | (2016.01) |
| A23K 50/20 | (2016.01) |
| A23K 50/50 | (2016.01) |
| A23K 50/70 | (2016.01) |

(52) U.S. Cl.
CPC .............. *A23K 10/30* (2016.05); *A23K 10/20* (2016.05); *A23K 20/163* (2016.05); *A23K 50/20* (2016.05); *A23K 50/40* (2016.05); *A23K 50/50* (2016.05); *A23K 50/70* (2016.05)

(58) Field of Classification Search
CPC .................................................. A23K 20/158
See application file for complete search history.

(56) References Cited

U.S. PATENT DOCUMENTS

| | | |
|---|---|---|
| 5,968,569 A | 10/1999 | Cavadini et al. |
| 6,929,793 B2 | 8/2005 | Spivey-Krobath et al. |
| 7,189,390 B2 | 3/2007 | Zink et al. |
| 2005/0084517 A1* | 4/2005 | Torney ................. A23K 20/105 424/439 |
| 2016/0143324 A1* | 5/2016 | Pan ....................... A23K 50/40 426/2 |
| 2016/0165927 A1 | 6/2016 | Pan et al. |

FOREIGN PATENT DOCUMENTS

| | | | | |
|---|---|---|---|---|
| CA | 2926752 A | * | 4/2015 | |
| CN | 105611843 A | * | 5/2016 | ............. A23K 10/20 |
| EP | 1143806 B1 | | 4/2006 | |
| EP | 1296565 B1 | | 8/2006 | |
| EP | 1482811 B1 | | 8/2006 | |
| EP | 1213970 B1 | | 11/2008 | |

OTHER PUBLICATIONS

PCT/IB2019/060530 International Search Report and the Written Opinion along with Notification of transmittal dated Feb. 11, 2020.
Davis, Carol et al., "Dietary Guidelines for Americans 2010" Dec. 1, 2010; https://health.gov/sites/default/files/2020-01/DietaryGuidelines2010.pdf.
Olson, Richard et al: Dietary Guidelines for Americans 2015-2020 Dec. 1, 2015 https://health.gov/our-work/food-nutrition/2015-2020-dietary-guidelines/guidelines/.
Leite, Joao Costa, et al. "Comparison of the effect of multicompotent and resistance training programs on metabolic health parameters in the elderly" 2015 Archives of Gerontology & Geriatrics 60 pp. 412-417 Ireland.
Coates, Alison M. et al. "Edible Nuts and Metabolic Health" Current Opinions Lipidology 2007 18:25-30 Australia.
Lattimer, James M. et al. "Effects of Dietary Fiber and Its Components on Metabolic Health" Nutrients 2010 2 1266-1289 USA.
Wolfram, Swen, "Effects of Green Tea and EGCG on Cardiovascular and Metabolic Health" Journal of the American College of Nutrition 2007 26:4 373S-388S USA.
Rueda, Ricardo "The role of complex lipids in attaining metabolic health" Current Cardiovascular Risk Rep 2014 8:371.

* cited by examiner

*Primary Examiner* — Qiuwen Mi

(57) ABSTRACT

The invention provides compositions and methods for metabolic health in an animal comprising administering a non-ketogenic composition to the animal, wherein the non-ketogenic composition comprises about 5% to about 25% carbohydrates, about 30% to about 60% protein, and about 10% to about 40% fat. Additionally, the composition can have a protein to carbohydrate ratio of at least 2:1.

13 Claims, No Drawings

METHODS FOR ENHANCING METABOLIC HEALTH IN AN ANIMAL

CROSS REFERENCE TO RELATED APPLICATIONS

This application claims priority to U.S. Provisional Application Ser. No. 62/779,139 filed Dec. 13, 2018, the disclosure of which is incorporated in its entirety herein by this reference.

BACKGROUND

Metabolic health (normal fasting blood glucose, triglycerides, free fatty acids, insulin etc.) is essential for healthy lifespan and reduced risk of many chronic diseases including cardiovascular disease, stroke, dementia, diabetes, and cancer etc.

Current solutions for metabolic health include exercise, administration of dietary fibers, complex lipids, and edible nuts. However, such solutions are not easily achievable and are commonly absent from routines and diets for most people.

Further, sugars and sugar-sweetened beverages in our diets are associated with poor metabolic health, and increased risk of type 2 diabetes and obesity.

As such, research continues to improve metabolic health and overcome the deficiencies of known treatments.

SUMMARY

In one embodiment, a method for enhancing metabolic health in an animal can comprise administering a non-ketogenic composition to the animal, wherein the non-ketogenic composition comprises about 5% to about 25% carbohydrates, about 30% to about 60% protein, and about 10% to about 40% fat. Additionally, the composition can have a protein to carbohydrate ratio of at least 2:1.

Other and further objects, features, and advantages of the invention will be readily apparent to those skilled in the art.

DETAILED DESCRIPTION

Definitions

The term "animal" means any animal that has a need for preserving lean body mass during weight loss, including human, avian, bovine, canine, equine, feline, hircine, lupine, murine, ovine, or porcine animals. In one aspect, the animal can be a mammal.

The term "companion animal" means domesticated animals such as cats, dogs, rabbits, guinea pigs, ferrets, hamsters, mice, gerbils, horses, cows, goats, sheep, donkeys, pigs, and the like. In one aspect, the companion animal can be a canine. In another aspect, the companion animal can be a feline.

The term "therapeutically effective amount" means an amount of a compound disclosed herein that (i) treats or prevents the particular disease, condition, or disorder, (ii) attenuates, ameliorates, or eliminates one or more symptoms of the particular disease, condition, or disorder, or (iii) prevents or delays the onset of one or more symptoms of the particular disease, condition, or disorder described herein.

The terms "treating", "treat", and "treatment" embrace both preventative, i.e., prophylactic, and palliative treatment.

The term "health and/or wellness of an animal" means the complete physical, mental, and social well-being of the animal, not merely the absence of disease or infirmity.

The term "in conjunction" means that the food composition, components thereof, or other compositions disclosed herein are administered to an animal (1) together in a single food composition or (2) separately at the same or different frequency using the same or different administration routes at about the same time or periodically. "Periodically" means that the food composition, components thereof, or other compositions are administered on a schedule acceptable for specific compounds or compositions. "About the same time" generally means that the food composition, components thereof, or other compositions are administered at the same time or within about 72 hours of each other.

The term "food" or "food product" or "food composition" means a product or composition that is intended for ingestion by an animal, including a human, and provides nutrition to the animal.

The term "non-ketogenic food composition" refers to a food composition that does not induce ketosis in the animal where ketosis in achieved by metabolizing fat into ketone bodies. Additionally, in aspect, the non-ketogenic food composition can exclude components that induce ketosis by oral ingestion of ketone precursors such as medium chain triglycerides.

The term "carbohydrate" refers to carbohydrates that are digestible, e.g. sugars and starches, and does not include fiber, e.g. cellulose or fermentable fibers.

The term "regular basis" means at least monthly administration and, in one aspect, at least weekly administration. More frequent administration or consumption, such as twice or three times weekly, can be performed in certain embodiments. In one aspect, an administration regimen can comprise at least once daily consumption.

The term "single package" means that the components of a kit are physically associated in or with one or more containers and considered a unit for manufacture, distribution, sale, or use. Containers include, but are not limited to, bags, boxes, cartons, bottles, packages such as shrink wrap packages, stapled or otherwise affixed components, or combinations thereof. A single package may be containers of the food compositions, or components thereof, physically associated such that they are considered a unit for manufacture, distribution, sale, or use.

The term "virtual package" means that the components of a kit are associated by directions on one or more physical or virtual kit components instructing the user how to obtain the other components, e.g., in a bag or other container containing one component and directions instructing the user to go to a website, contact a recorded-message or a fax-back service, view a visual message, or contact a caregiver or instructor to obtain instructions on how to use the kit or safety or technical information about one or more components of a kit.

The term "about" means plus or minus 20% of a numeric value; in one aspect, plus or minus 10%; in another aspect, plus or minus 5%; and in one specific aspect, plus or minus 2%. For example, in one aspect where about is plus or minus 20% of a numeric value, the phrase "from about 10% to about 20%" could include a range from 8% to 24% or 12% to 16%, include any subranges therein.

As used herein, embodiments, aspects, and examples using "comprising" language or other open-ended language can be substituted with "consisting essentially of" and "consisting of" embodiments.

The term "complete and balanced" when referring to a food composition means a food composition that contains all known required nutrients in appropriate amounts and proportions based on recommendations of recognized authorities in the field of animal nutrition, and are therefore capable of serving as a sole source of dietary intake to maintain life or promote production, without the addition of supplemental nutritional sources. Nutritionally balanced pet food and animal food compositions are widely known and widely used in the art, e.g., complete and balanced food compositions formulated according to standards established by the Association of American Feed Control Officials (AAFCO).

All percentages expressed herein are by weight of the composition on a dry matter basis unless specifically stated otherwise. The skilled artisan will appreciate that the term "dry matter basis" means that an ingredient's concentration or percentage in a composition is measured or determined after any free moisture in the composition has been removed.

As used herein, ranges are used herein in shorthand, so as to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a supplement", "a method", or "a food" includes a plurality of such "supplements", "methods", or "foods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, certain compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

DETAILED DESCRIPTION

The present methods and compositions are based upon the discovery that specific food compositions have been found to enhance metabolic health in an animal. Specifically, the present food compositions utilize a ratio of protein to carbohydrate that enhances metabolic health by lowering blood free fatty acids, total cholesterol, triacylglycerol, and/or insulin, to provide health benefits as compared to known treatment regimens such as low caloric food compositions, dieting, or the use of costly additives or supplements. However, the use of such treatments can be used in conjunction with the methods and compositions.

In accordance with these discoveries, in one embodiment, a method for enhancing metabolic health in an animal can comprise administering a non-ketogenic food composition to the animal, wherein the non-ketogenic food composition comprises: from about 30% to about 65% protein, from about 5% to about 25% carbohydrate, and from about 10% to about 40% fat. Generally, the non-ketogenic food composition can have a protein to carbohydrate ratio of at least 2:1.

Generally, such ratios of protein to carbohydrate can range from about 2:1 to about 10:1, although ratios higher than 10:1 could be considered. In one embodiment, the ratio of protein to carbohydrate ranges from about 2:1 to about 6:1. In one aspect, the ratio of protein to carbohydrate can range from about 4:1 to about 6:1. In another aspect, the ratio of protein to carbohydrate can range from about 3:1 to about 6:1.

Generally, the present compositions comprise a protein. The protein can be crude protein material and may comprise vegetable proteins such as soybean meal, soy protein concentrate, corn gluten meal, wheat gluten, cottonseed, and peanut meal, or animal proteins such as casein, albumin, and meat protein. Examples of meat protein useful herein include beef, pork, lamb, equine, poultry, fish, and mixtures thereof. In one embodiment, the food compositions can comprises the protein in amounts from about 30%, 35%, 40%, 45%, 50%, 55%, or even 60% to about 35%, 40%, 45%, 50%, 55%, 60%, or even 65%, including various subranges within these amounts. In one aspect, the protein can be from about 45% to about 55% of the food composition.

Generally, any type of carbohydrate can be used in the food compositions. Examples of suitable carbohydrates include grains or cereals such as rice, corn, millet, sorghum, alfalfa, barley, soybeans, canola, oats, wheat, rye, triticale and mixtures thereof. The compositions may also optionally comprise other materials such as dried whey and other dairy by-products. In one embodiment, the carbohydrate comprises from about 5% to about 10% of the food composition. In another embodiment, the carbohydrate comprises from about 10% to about 20% of the food compositions. In other aspects, the carbohydrate can be present in amounts from about 5%, 6%, 7%, 8%, 9%, 10%, 11%, 12%, 13%, 14%, 15%, 16%, 17%, 18%, 19%, or even 20%, to about 6%, 7%, 8%, 9%, 10%, 11%, 12%, 13%, 14%, 15%, 16%, 17%, 18%, 19%, 20%, 21%, 22%, 23%, 24%, or 25%.

Generally, the food compositions include fat. Examples of suitable fats include animal fats and vegetable fats. In one aspect, the fat source can be an animal fat source such as tallow or poultry fat. Vegetable oils such as corn oil, sunflower oil, safflower oil, grape seed oil, soy bean oil, olive oil, fish oil, avocado and other oils rich in monounsaturated and polyunsaturated fatty acids, may also be used. In one embodiment, the food compositions can comprises the fat in amounts from about 10%, 15%, 20%, 25%, 30%, or even 35% to about 15%, 20%, 25%, 30%, 35%, or even 40%, including various subranges within these amounts. In one aspect, the fat comprises from about 25% to about 35% of the food composition.

The administration can be performed on as-needed basis, an as-desired basis, a regular basis, or intermittent basis. In one aspect, the food composition can be administered to the animal on a regular basis. In one aspect, at least weekly administration can be performed. More frequent administration or consumption, such as twice or three times weekly, can be performed in certain embodiments. In one aspect, an administration regimen can comprise at least once daily consumption.

According to the presently described methods, administration, including administration as part of a dietary regimen, can span a period ranging from parturition through the adult life of the animal. In various embodiments, the animal can be a human or companion animal such as a dog or cat. In certain embodiments, the animal can be a young or growing animal. In other embodiments, administration can begin, for example, on a regular or extended regular basis, when the animal has reached more than about 10%, 20%, 30%, 40%, or 50% of its projected or anticipated lifespan. In some embodiments, the animal can have attained 40, 45, or 50% of its anticipated lifespan. In yet other embodiments, the animal can be older having reached 60, 66, 70, 75, or 80% of its likely lifespan. A determination of lifespan may be based on actuarial tables, calculations, estimates, or the like, and may consider past, present, and future influences or factors that are known to positively or negatively affect lifespan. Consideration of species, gender, size, genetic factors, environmental factors and stressors, present and past health status, past and present nutritional status, stressors, and the like may also influence or be taken into consideration when determining lifespan.

Such administration can be performed for a time required to accomplish one or more objectives described herein, e.g., enhancing metabolic health in an animal. Other administration amounts may be appropriate and can be determined based on the animal's initial weight as well as other variables such as species, gender, breed, age, desired health benefit, etc.

The moisture content for such food compositions varies depending on the nature of the food composition. The food compositions may be dry compositions (e.g., kibble), semi-moist compositions, wet compositions, or any mixture thereof. In one embodiment, the composition can be a pet food composition, and in one aspect, can be a complete and nutritionally balanced pet food. In this embodiment, the pet food may be a "wet food", "dry food", or food of "intermediate moisture" content. "Wet food" describes pet food that is typically sold in cans or foil bags and has a moisture content typically in the range of about 70% to about 90%. "Dry food" describes pet food that is of a similar composition to wet food but contains a limited moisture content typically in the range of about 5% to about 15% or 20% (typically in the form or small biscuit-like kibbles). In one embodiment, the compositions can have moisture content from about 5% to about 20%. Dry food products include a variety of foods of various moisture contents, such that they are relatively shelf-stable and resistant to microbial or fungal deterioration or contamination. Also, in one aspect, dry food compositions can be extruded food products for either humans or companion animals.

The food compositions may also comprise one or more fiber sources. Such fiber sources include fiber that is soluble, insoluble, fermentable, and nonfermentable. Such fibers can be from plant sources such as marine plants but microbial sources of fiber may also be used. A variety of soluble or insoluble fibers may be utilized, as will be known to those of ordinary skill in the art. The fiber source can be beet pulp (from sugar beet), gum arabic, gum talha, psyllium, rice bran, carob bean gum, citrus pulp, pectin, fructooligosaccharide, short chain oligofructose, mannanoligofructose, soy fiber, arabinogalactan, galactooligosaccharide, arabinoxylan, or mixtures thereof.

Alternatively, the fiber source can be a fermentable fiber. Fermentable fiber has previously been described to provide a benefit to the immune system of a companion animal. Fermentable fiber or other compositions known to skilled artisans that provide a prebiotic to enhance the growth of probiotics within the intestine may also be incorporated into the composition to aid in the enhancement of the benefits described herein or to the immune system of an animal.

In some embodiments, the ash content of the food composition ranges from less than 1% to about 15%. In one aspect, the ash content can be from about 5% to about 10%.

Generally, the food composition can be suitable for consumption by an animal, including humans and companion animals such as dogs and cats, as a meal, component of a meal, a snack, or a treat. Such compositions can include complete foods intended to supply the necessary dietary requirements for an animal. Examples of such food compositions include but are not limited to dry foods, wet foods, drinks, bars, frozen prepared foods, shelf prepared foods, and refrigerated prepared foods.

Food compositions may further comprise one or more substances such as vitamins, minerals, antioxidants, probiotics, prebiotics, salts, and functional additives such as palatants, colorants, emulsifiers, and antimicrobial or other preservatives. Minerals that may be useful in such compositions include, for example, calcium, phosphorous, potassium, sodium, iron, chloride, boron, copper, zinc, magnesium, manganese, iodine, selenium, and the like. Examples of additional vitamins useful herein include such fat soluble vitamins as A, D, E, and K. Inulin, amino acids, enzymes, coenzymes, and the like may be useful to include in various embodiments.

The present methods for enhancing metabolic health can provide other health benefits to the animal. In one embodiment, the health benefit can include reduced body fat, reduced visceral fat, reduced abdominal fat, reduced weight, reduced weight gain, reduced insulin resistance, lower cholesterol, lower glucose, lower triglycerides, lower insulin, decreased voluntary food intake, increased satiety, maximal fat oxidation, maximal glucose oxidation, improved insulin sensitivity, reduced risk of metabolic syndrome, reduced risk of diabetes, reduced risk of cardiovascular disease, and combinations thereof.

In various embodiments, the food compositions contain at least one of (1) one or more probiotics; (2) one or more inactivated probiotics; (3) one or more components of inactivated probiotics that promote health benefits similar to or the same as the probiotics, e.g., proteins, lipids, glycoproteins, and the like; (4) one or more prebiotics; and (5) combinations thereof. The probiotics or their components can be integrated into the food compositions (e.g., uniformly or non-uniformly distributed in the compositions) or applied to the food compositions (e.g., topically applied with or without a carrier). Such methods are known to skilled artisans, e.g., U.S. Pat. No. 5,968,569 and related patents.

Typical probiotics include, but are not limited to, probiotic strains selected from *Lactobacilli*, *Bifidobacteria*, or *Enterococci*, e.g., *Lactobacillus reuteii*, *Lactobacillus acidophilus*, *Lactobacillus animalis*, *Lactobacillus ruminis*, *Lactobacillus johnsonii*, *Lactobacillus casei*, *Lactobacillus paracasei*, *Lactobacillus rhamnosus*, *Lactobacillus fermentum*, and *Bifidobacterium* sp., *Enterococcus faecium* and *Enterococcus* sp. In some embodiments, the probiotic strain can be selected from the group consisting of *Lactobacillus reuteri* (NCC2581; CNCM I-2448), *Lactobacillus reuteri* (NCC2592; CNCM I-2450), *Lactobacillus rhamnosus* (NCC2583; CNCM I-2449), *Lactobacillus reuteri* (NCC2603; CNCM I-2451), *Lactobacillus reuteri* (NCC2613; CNCM I-2452), *Lactobacillus acidophilus* (NCC2628; CNCM I-2453), *Bifidobacterium adolescentis* (e.g., NCC2627), *Bifidobacterium* sp. NCC2657 or *Enterococcus faecium* SF68 (NCIMB 10415). Generally, the food compositions can contain probiotics in amounts sufficient to supply from about $10^4$ to about $10^{12}$ cfu/animal/day, in one aspect, from $10^5$ to about $10^{11}$ cfu/animal/day, and in one specific aspect, from $10^7$ to $10^{10}$ cfu/animal/day. When the probiotics are killed or inactivated, the amount of killed or inactivated probiotics or their components should produce a similar beneficial effect as the live microorganisms. Many such probiotics and their benefits are known to skilled artisans, e.g., EP1213970B1, EP1143806B1, U.S. Pat. No. 7,189,390, EP1482811B1, EP1296565B1, and U.S. Pat. No. 6,929,793. In one embodiment, the probiotic can be *Enterococcus faecium* SF68 (NCIMB 10415). In another embodiment, the probiotics can be encapsulated in a carrier using methods and materials known to skilled artisans.

As stated, the food compositions may contain one or more prebiotics, e.g., fructo-oligosaccharides, gluco-oligosaccharides, galacto-oligosaccharides, isomalto-oligosaccharides, xylo-oligosaccharides, soybean oligosaccharides, lactosucrose, lactulose, and isomaltulose. In one embodiment, the prebiotic can be chicory root, chicory root extract, inulin, or combinations thereof. Generally, prebiotics can be administered in amounts sufficient to positively stimulate the healthy microflora in the gut and cause these "good" bacteria to reproduce. Typical amounts range from about one to about 10 grams per serving or from about 5% to about 40% of the recommended daily dietary fiber for an animal. The probiotics and prebiotics can be made part of the composition by any suitable means. Generally, the agents can be mixed with the composition or applied to the surface of the composition, e.g., by sprinkling or spraying. When the agents are part of a kit, the agents can be admixed with other materials or in their own package. Typically, the food composition contains from about 0.1 to about 10% prebiotic, in one aspect, from about 0.3 to about 7%, and in one specific aspect, from about 0.5 to 5%, on a dry matter basis. The prebiotics can be integrated into the compositions using methods known to skilled artisans, e.g., U.S. Pat. No. 5,952,033.

A skilled artisan can determine the appropriate amount of food ingredients, vitamins, minerals, probiotics, prebiotics, antioxidants, or other ingredients to be used to make a particular composition to be administered to a particular animal. Such artisan can consider the animal's species, age, size, weight, health, and the like in determining how best to formulate a particular composition comprising such ingredients. Other factors that may be considered include the desired dosage of each component, the average consumption of specific types of compositions by different animals (e.g., based on species, body weight, activity/energy demands, and the like), and the manufacturing requirements for the composition.

In a further aspect, the present disclosure provides kits suitable for administering food compositions to animals. The kits comprise in separate containers in a single package or in separate containers in a virtual package, as appropriate for the kit component, one or more of (1) one or more ingredients suitable for consumption by an animal; (2) instructions for how to combine the ingredients and other kit components to produce a composition useful for providing a health benefit as described herein; (3) instructions for how to use the food composition to obtain such benefits; (4) one or more probiotics; (5) one or more inactivated probiotics; (6) one or more components of inactivated probiotics that promote health benefits similar to or the same as the probiotics, e.g., proteins, lipids, glycoproteins, and the like; (7) one or more prebiotics; (8) a device for preparing or combining the kit components to produce a composition suitable for administration to an animal; and (9) a device for administering the combined or prepared kit components to an animal. In one embodiment, the kit comprises one or more ingredients suitable for consumption by an animal. In another embodiment, the kit comprises instructions for how to combine the ingredients to produce a composition useful for obtaining a health benefit as described herein.

When the kit comprises a virtual package, the kit is limited to instructions in a virtual environment in combination with one or more physical kit components. The kit contains components in amounts sufficient for to obtain a health benefit as described herein. Typically, the kit components can be admixed just prior to consumption by an animal. The kits may contain the kit components in any of various combinations and/or mixtures. In one embodiment, the kit contains a container of food for consumption by an animal. The kit may contain additional items such as a device for mixing ingredients or a device for containing the admixture, e.g., a food bowl. In another embodiment, the food compositions can be mixed with additional nutritional supplements such as vitamins and minerals that promote good health in an animal. The components can be each provided in separate containers in a single package or in mixtures of various components in different packages. In some embodiments, the kits comprise one or more other ingredients suitable for consumption by an animal. In one aspect, such kits can comprise instructions describing how to combine the ingredients to form a food composition for consumption by the animal, generally by mixing the ingredients or by applying optional additives to the other ingredients, e.g., by sprinkling nutritional supplements on a food composition.

In a further aspect, a means for communicating information about or instructions for one or more of (1) using a food composition for obtaining one of the health benefits described herein; (2) contact information for consumers to use if they have a question regarding the methods and compositions described herein; and (3) nutritional information about the food composition can be provided. The communication means can be useful for instructing on the benefits of using the present methods or compositions and communicating the approved methods for administering food compositions to an animal. The means comprises one or more of a physical or electronic document, digital storage media, optical storage media, audio presentation, audiovisual display, or visual display containing the information or instructions. In one aspect, the means can be selected from the group consisting of a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof.

In another aspect, methods for manufacturing a food composition comprising one or more other ingredients suitable for consumption by an animal, e.g., one or more of protein, fat, carbohydrate, fiber, vitamins, minerals, probiotics, prebiotics, and the like, can comprise admixing one or more of the ingredients suitable for consumption by an animal. The composition can be made according to any method suitable in the art.

In another aspect, a package useful for containing compositions described herein can comprise at least one material suitable for containing the food composition and a label affixed to the package containing a word or words, picture, design, acronym, slogan, phrase, or other device, or combination thereof that indicates that the contents of the package contains the food composition. In some embodiments, the label affixed to the package contains a word or words, picture, design, acronym, slogan, phrase, or other device, or combination thereof that indicates that the contents of the package contains the food composition with beneficial properties relating to a health benefit described herein. In one aspect, such device can comprise the words "enhances metabolic health," or an equivalent or similar expression printed on the package. Any package configuration and packaging material suitable for containing the composition can be used herein, e.g., bag, box, bottle, can, pouch, and the like manufactured from paper, plastic, foil, metal, and the like. In one embodiment, the package contains a food composition adapted for a particular animal such as a human, canine, or feline, as appropriate for the label, in one aspect, a companion animal food composition for dogs or cats. In one embodiment, the package can be a can or pouch comprising a food composition described herein. In various embodiments, the package further comprises at least one window that permit the package contents to be viewed without opening the package. In some embodiments, the window can be a transparent portion of the packaging material. In others, the window can be a missing portion of the packaging material.

EXAMPLES

The invention can be further illustrated by the following example, although it will be understood that this example is included merely for purposes of illustration and is not intended to limit the scope of the invention unless otherwise specifically indicated.

Example 1

Metabolism

Forty-eight (48) male SD rats housed individually in rat cages in a rodent room with well-controlled room temperature, humidity and 12 hour light:dark cycle. They were given free access to control diet (D601, 41% carbohydrate, 34% fat and 25% protein) and water for 11 days to adapt new environment. Weekly body weight and daily food intake were measured during this period.

After 11 days of adaptation, rats were divided into four groups based on weekly body weight, weight gain, and daily food intake during the adaptation period. The rats were then staged into the treatments with 4 rats per group in every 3 days, and were fed D601 (41% carbohydrate, 34% fat and 25% protein of the total energy of the diet), D602 (31% carbohydrate, 34% fat and 35% protein), D603 (21% carbohydrate, 34% fat and 45% protein) and D604 (11% carbohydrate, 34% fat and 55% protein), respectively.

After 3 weeks of treatments (chronic effects), rats were placed individually into the chambers of the calorimetry system. The data of oxygen consumption and carbon dioxide production were collected for 48 hours and stored in the computer data system, and used to calculate the rate of glucose oxidation, with the first 3.5-hour data being excluded. Rats were provided with free access to the treatment diets and water during the data collection. The rate of glucose oxidation was calculated as follows: Rate of glucose oxidation (mg/min/kg)=$(4.12*VCO_2)-(2.91*VO_2)$, where $VO_2$ is volume of oxygen consumed each minute and VCO2 is the volume of carbon dioxide expelled each minute.

The effects of the diets on glucose oxidation were calculated based on day (12 h) and night (12 h) and day+night (24 h). Rats are nocturnal and eat at night, so night is the 12 hours of normal meal time.

At night, when rats were active and ate ad libitum, the control diet (D601) with 41% dietary carbohydrates and D602 with 31% dietary carbohydrates lead to same rate of glucose oxidation, indicating that a diet with 31% dietary carbohydrates results in the maximal up-regulation of glucose oxidation. Diets with 11% dietary carbohydrates (D604) has the lowest rate of glucose oxidation, following by the diet with 21% dietary carbohydrates (D603).

Data at daytime also indicate that the maximal rate of glucose oxidation is reached when the rats ate the diet with 31% dietary carbohydrate (D602). Again, the diet with 11% carbohydrates had the lowest rate of glucose oxidation, following by the diet with 21% dietary carbohydrates.

When the rate of glucose oxidation was calculated over 24 hours of a day, the data showed that the control diet (D601) with 41% dietary carbohydrates and D602 with 31% dietary carbohydrates lead to same rate of glucose oxidation, confirming that a diet with 31% dietary carbohydrates results in the maximal up-regulation of glucose oxidation. Again, the diet with 11% carbohydrates had the lowest rate of glucose oxidation, following by the diet with 21% dietary carbohydrates as shown in Table 1.

TABLE 1

| Diet | Chronic Glucose Oxidation Day (mg/min/kg BW*) | Chronic Glucose Oxidation Night (mg/min/kg BW*) | Chronic Glucose Oxidation 24 Hours (mg/min/kg BW*) |
| --- | --- | --- | --- |
| D601 | 21.12 | 33.21 | 27.17 |
| D602 | 19.41 | 29.88 | 24.64 |
| D603 | 17.76 | 25.47 | 21.61 |
| D604 | 15.92 | 22.62 | 19.29 |

*BW—body weight

These data indicate that 31% of dietary energy from digestible carbohydrates saturate or maximize the body's ability to oxidize glucose, therefore % dietary energy from digestible carbohydrate should be kept below 31% to meet the body's maximal ability to oxidize glucose and reduce postprandial glucose spikes in the blood and tissues. Surprisingly, this finding contradicts known recommendations of 45-60% total energy intake from dietary carbohydrate or proposed physiological need for dietary carbohydrates of 40% to 50% of total caloric intake for sedentary adult females, and 33 to 40% of total caloric intake for sedentary adult males.

Example 2

Fat Oxidation

Forty-eight (48) male SD rats housed individually in rat cages in a rodent room with well-controlled room temperature, humidity and 12 hour light:dark cycle. They were given free access to control diet (D601, 41% carbohydrate, 34% fat and 25% protein) and water for 11 days to adapt new environment. Weekly body weight and daily food intake were measured during this period.

After 11 days of adaptation, rats were divided into four groups based on weekly body weight, weight gain, and daily food intake during the adaptation period. The rats were then staged into the treatments with 4 rats per group in every 3 days, and were fed D601 (41% carbohydrate, 34% fat and 25% protein of the total energy of the diet), D602 (31% carbohydrate, 34% fat and 35% protein), D603 (21% carbohydrate, 34% fat and 45% protein) and D604 (11% carbohydrate, 34% fat and 55% protein), respectively.

After 3 days on test diets, rats of each group were staged into the energy metabolism study cages with 4 rats per group every 3 days by placing rats individually into the chambers of an indirect calorimetry system (Oxymax; Columbus Instruments, Columbus, Ohio, USA). The data for oxygen consumption and carbon dioxide production were collected for 48 hours and stored in the computer data system. During the data collection period rats were provided with free access to diet and water. After 48 hours of data collection, rats were put back into standard rat cages. Three sets of measurement were conducted for each group, with all groups assessed in parallel (i.e., in each set of measurement, equal number of rats in each group were assigned). The data were used to calculate respiratory exchange ratio, heat production, fat oxidation rate, carbohydrate oxidation rate, and energy expenditure, with the first 3.5-hour data being excluded.

Second measurement of energy metabolism was performed after 3 weeks of treatment. After 3 weeks of treatment, the measurement of energy metabolism was repeated in all rats following the same experimental protocol as described for the first measurement. Rate of fat oxidation $(mg/min/kg)=(1.689*VO_2)-(1.689*VCO_2)$, where $VO_2$ is volume of oxygen consumed each minute and $VCO_2$ is the volume of carbon dioxide expelled each minute. Data is presented in Table 2.

TABLE 2

| | Fat oxidation (mg/min/kg) | | | | | |
| --- | --- | --- | --- | --- | --- | --- |
| | 1st measurement | | | 2nd measurement | | |
| Diet | Day | Night | Day + Night | Day | Night | Day + Night |
| D601 | −0.47 | −3.17 | −1.89 | 1.02 | 0.22 | 0.63 |
| D602 | −0.51 | −2.92 | −1.71 | 1.82 | 1.19 | 1.50 |
| D603 | 1.00 | −0.91 | −0.28 | 2.10 | 1.98 | 2.02 |
| D604 | 1.69 | 0.22 | 0.92 | 2.49 | 2.92 | 2.72 |

With constant dietary fat intake (34% of total dietary calories lower than reported ketogenic diet levels and within the range of 20 and 35 percent of total daily calories as fats recommended by the Dietary Guideline For Americans 2010), a control diet with the dietary carbohydrate intake at the level of 41% of dietary calories, which is closer to the low end of the 45-65% range recommended by the Dietary Guideline For Americans 2010, totally prevents fat oxidation during the 12-hours of regular meals, and minimizes the fat oxidation during the 24 hour of a day. On the contrary, with same fat intake, a diet with 11% calories as carbohydrates maximize fat oxidation during the 12-hours of regular meals and during the 24 hour of a day. In addition, Diets with dietary carbohydrate of 31% and 21% also enhance fat oxidation at both periods with less efficacy than the diet with 11% dietary carbohydrates.

Example 3

Energy Expenditure

Forty-eight (48) male SD rats housed individually in rat cages in a rodent room with well-controlled room temperature, humidity and 12 hour light:dark cycle. They were given free access to control diet (D601, 41% carbohydrate, 34% fat and 25% protein) and water for 11 days to adapt new environment. Weekly body weight and daily food intake were measured during this period.

After 11 days of adaptation, rats were divided into four groups based on weekly body weight, weight gain and daily food intake during the adaptation period. The rats were then staged into the treatments with 4 rats per group in every 3 days, and were fed D601 (41% carbohydrate, 34% fat and 25% protein of the total energy of the diet), D602 (31% carbohydrate, 34% fat and 35% protein), D603 (21% carbohydrate, 34% fat and 45% protein) and D604 (11% carbohydrate, 34% fat and 55% protein), respectively. The rats had free access to food and water during the three weeks of the feeding study.

After 3 days on test diets, rats of each group were staged into the energy metabolism study cages with 4 rats per group every 3 days by placing rats individually into the chambers of an indirect calorimetry system (Oxymax; Columbus Instruments, Columbus, Ohio, USA). The data for oxygen consumption and carbon dioxide production were collected for 48 hours and stored in the computer data system. During the data collection period rats were provided with free access to diet and water. After 48 hours of data collection, rats were put back into standard rat cages. Three sets of measurement were conducted for each group, with all groups assessed in parallel (i.e., in each set of measurement, equal number of rats in each group were assigned. The data were used to calculate respiratory exchange ratio, heat production, fat oxidation rate, carbohydrate oxidation rate, and energy expenditure, with the first 3.5-hour data being excluded. After 3 weeks of treatment, the measurement of energy metabolism was repeated in all rats following the same experimental protocol as described for the first measurement. Table 3 provides data obtained using an equation for rate of energy expenditure $(kJ/min/kg)=(15.88*VO_2)-(4.87*VCO_2)$, where $VO_2$ is volume of oxygen consumed each minute and $VCO_2$ is the volume of carbon dioxide expelled each minute.

TABLE 3

| | Energy expenditure (kJ/min/kg) | | | | | |
| --- | --- | --- | --- | --- | --- | --- |
| | 1st measurement | | | 2nd measurement | | |
| Diet | Day | Night | Day + Night | Day | Night | Day + Night |
| D601 | 166.03 | 196.16 | 181.98 | 148.32 | 184.77 | 166.25 |
| D602 | 176.41 | 208.47 | 192.45 | 158.05 | 194.15 | 177.30 |
| D603 | 181.26 | 218.91 | 201.20 | 161.73 | 203.70 | 184.16 |
| D604 | 186.87 | 230.81 | 210.34 | 177.52 | 225.84 | 203.33 |

With identical dietary fat intake (34% of total dietary energy from dietary fat), the diets with 21% dietary carbohydrates, 34% fat and 45% protein (a protein:CHO ratio of 2:1) and 11% carbohydrates, 34% fats and 55% protein (a protein:CHO ratio of 5:1) increased energy expenditure by 2.94 and 7.71% respectively. More importantly, when the protein:CHO ratios was reduced to 1.6:1 or 1:1, no significant increase in energy expenditure was observed. These data indicate that a protein:CHO ratio must be at least 2:1 to enhance energy expenditure.

Example 4

Satiety

Forty-eight (48) male SD rats housed individually in rat cages in a rodent room with well-controlled room temperature, humidity and 12 hour light:dark cycle. They were given free access to control diet (D601, 41% carbohydrate, 34% fat and 25% protein) and water for 11 days to adapt new environment. Weekly body weight and daily food intake were measured during this period.

After 11 days of adaptation, rats were divided into four groups based on weekly body weight, weight gain and daily food intake during the adaptation period. The rats were then staged into the treatments with 4 rats per group in every 3 days, and were fed D601 (41% carbohydrate, 34% fat and 25% protein of the total energy of the diet), D602 (31% carbohydrate, 34% fat and 35% protein), D603 (21% carbohydrate, 34% fat and 45% protein) and D604 (11% carbohydrate, 34% fat and 55% protein), respectively. The rats had free access to food and water during the three weeks of the feeding study. Weekly food intake was recorded during the study. Both weekly and total food intake was analyzed. Data was obtained and is presented in Table 4.

TABLE 4

| | Daily food intake (g) | | | |
| --- | --- | --- | --- | --- |
| Diet | Week 1 | Week 2 | Week 3 | Total food intake |
| D601 | 30.50 | 29.44 | 26.91 | 608.01 |
| D602 | 31.18 | 29.16 | 23.89 | 589.60 |
| D603 | 28.83 | 24.64 | 22.03 | 528.47 |
| D604 | 25.80 | 22.80 | 20.33 | 482.55 |

With identical dietary fat intake (34% of total dietary energy from dietary fat), rats significantly reduced their voluntary food intake by 4.81% and 10.89% respectively under ad libitum feeding condition when they were fed on diets containing 21% carbohydrates, 34% fats, and 45% protein (a protein:CHO ratio of 2:1) or 11% carbohydrates, 34% fats, and 55% protein (a protein:CHO ratio of 5:1). More importantly, when the protein:CHO ratios was reduced to 1.6:1 or 1:1, no satiety benefit and increased voluntary food intake were observed. These data indicate that a protein:CHO ratio must be at least 2:1 to enhance satiety and reduce voluntary food intake.

Example 5

Metabolic Health Parameters

Forty-eight (48) male SD rats housed individually in rat cages in a rodent room with well-controlled room temperature, humidity and 12 hour light:dark cycle. They were given free access to control diet (D601, 41% carbohydrate, 34% fat and 25% protein) and water for 11 days to adapt new environment. Weekly body weight and daily food intake were measured during this period.

After 11 days of adaptation, rats were divided into four groups based on weekly body weight, weight gain and daily food intake during the adaptation period. The rats were then staged into the treatments with 4 rats per group in every 3 days, and were fed D601 (41% carbohydrate, 34% fat and 25% protein of the total energy of the diet), D602 (31% carbohydrate, 34% fat and 35% protein), D603 (21% carbohydrate, 34% fat and 45% protein) and D604 (11% carbohydrate, 34% fat and 55% protein), respectively. The rats had free access to food and water during the three weeks of the feeding study. Weekly food intake was recorded during the study. Both weekly and total food intake was analyzed. Data was obtained and is presented in Table 4.

After 3 weeks of treatments, blood samples were collected for the analysis of metabolic health parameters. The serum concentrations of total cholesterol, triacylglycerols, and glucose were analyzed in duplicate on a Cobas-6000 Analyzer (Roche Diagnostics), with all reagents being purchased from the manufacturer of the analyzer. The serum concentration of non-esterified (free) fatty acids was determined in triplicate using a commercial kit following the kit instructions (Cayman Chemicals). The concentration of serum insulin (Mercodia AB, Uppsala, Sweden), was analyzed using the commercial ELISA kits following the kit instructions. Insulin were measured in duplicate. The concentrations were within the kit detection ranges that were 0.15-5.5 µg/L for insulin. Data obtained is presented in Table 5.

TABLE 5

| | Diet ID | | | |
| --- | --- | --- | --- | --- |
| Metabolic Health Parameter | 601 | 602 | 603 | 604 |
| Free fatty acids (µmol/L) | 161.43 | 152.85 | 147.81 | 115.53 |
| Total cholesterol (mmol/L) | 2.81 | 2.66 | 2.37 | 2.49 |
| Triacylglycerol (mmol/L) | 1.65 | 1.54 | 1.36 | 1.43 |
| Glucose (mmol/L) | 9.2 | 8.72 | 9.16 | 8.46 |
| Insulin (ng/mL) | 0.90 | 0.95 | 0.54 | 0.55 |

With identical dietary fat intake (34% of total dietary energy from dietary fat), the two diets with protein:CHO ratios of 2:1 (603) and 5:1 (604) lowered blood free fatty acids, total cholesterol, triacylglycerol, insulin, and the diet with 5:1 ratio of protein:CHO also lowered blood glucose. These data indicated that without limiting dietary fat, diets with protein:CHO ratios from 2:1 to 5:1 can promote metabolic health in rats. The blood insulin data confirmed the importance of keeping the protein:CHO ratios at least at 2:1 to maintain lower blood insulin.

In the specification, there have been disclosed certain embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims, the invention may be practiced otherwise than as specifically described.

What is claimed is:

1. A method for enhancing metabolic health in an animal comprising administering a non-ketogenic food composition to the animal, wherein the non-ketogenic food composition comprises:
   from about 30% to about 65% protein,
   from about 5% to about 25% carbohydrate, and
   from 30% to 40% fat;
   wherein the non-ketogenic food composition has a protein to carbohydrate ratio of at least about 2:1.

2. The method of claim 1, wherein the protein comprises about 45% to 55% of the non-ketogenic food composition.

3. The method of claim 1, wherein the carbohydrate comprises about 10% to about 20% of the non-ketogenic food composition.

4. The method of claim 1, wherein the fat comprises 30% to 35% of the non-ketogenic food composition.

5. The method of claim 1, wherein the non-ketogenic food composition is administered to the animal on a regular basis.

6. The method of claim 1, wherein the ratio of protein to carbohydrate ranges from about 2:1 to about 6:1.

7. The method of claim 1, wherein the non-ketogenic food composition is a pet food composition.

8. The method of claim 1, wherein the animal is a companion animal.

9. The method of claim 1, wherein the method provides at least one health benefit selected from the group consisting of lower blood free fatty acids, lower total cholesterol, lower triacylglycerol, lower insulin, lower blood glucose, and any combination thereof, compared to the blood free fatty acids, total cholesterol, triacylglycerol, blood glucose, and insulin of the animal when not consuming the non-ketogenic food composition.

10. The method of claim 1, wherein the method provides a health benefit selected from the group consisting of reduced body fat, reduced visceral fat, reduced abdominal fat, reduced weight, reduced weight gain, reduced insulin resistance, lower cholesterol, lower glucose, lower triglycerides, lower insulin, decreased voluntary food intake, increased satiety, maximal fat oxidation, maximal glucose oxidation, improved insulin sensitivity, reduced risk of metabolic syndrome, reduced risk of diabetes, reduced risk of cardiovascular disease, and combinations thereof.

11. The method of claim 1, wherein the protein to carbohydrate ratio of the non-ketogenic food composition is from about 2:1 to about 3.1.

12. The method of claim 1, wherein the protein to carbohydrate ratio of the non-ketogenic food composition is about 2:1.

13. The method of claim 1, wherein the fat is 35% to 40% of the non-ketogenic food composition.

* * * * *